UNITED STATES PATENT OFFICE.

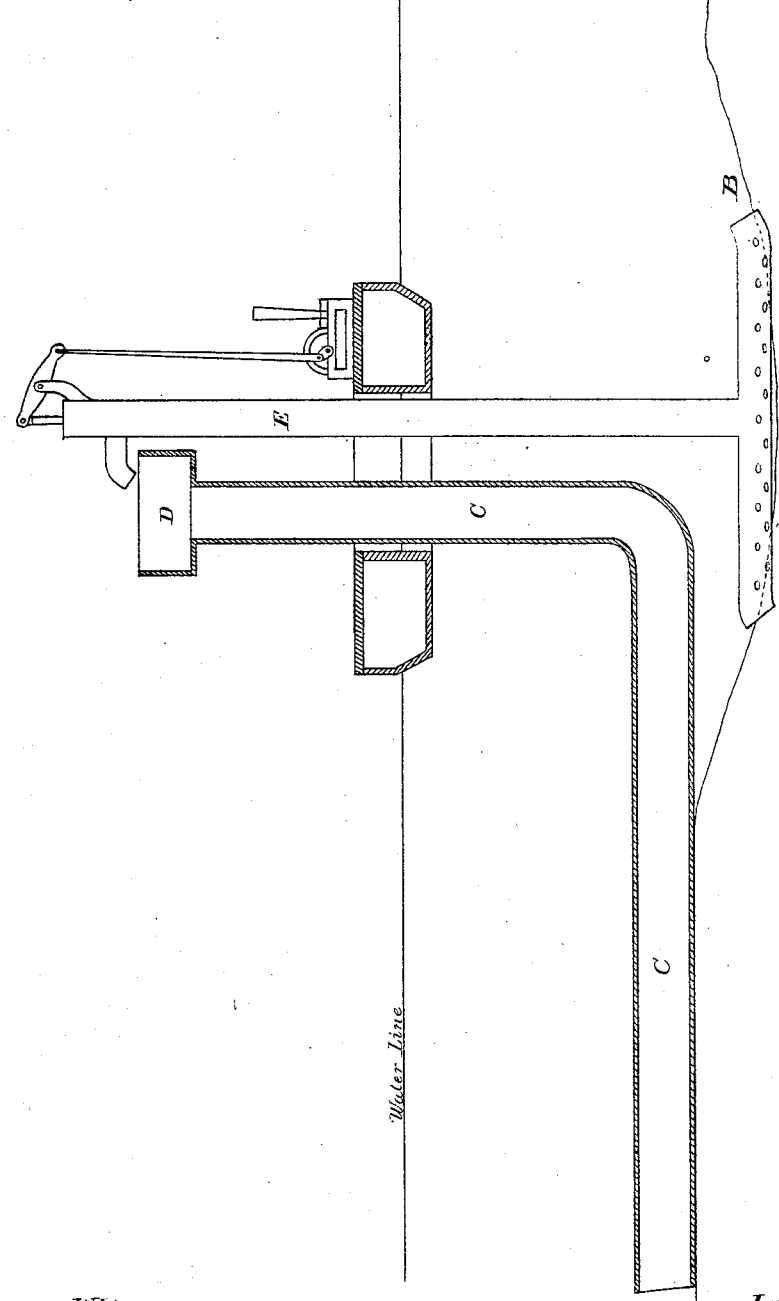

LEVI R. COMSTOCK, OF PHILADELPHIA, PENNSYLVANIA.

IMPROVEMENT IN MEANS FOR DRAINING BASINS.

Specification forming part of Letters Patent No. 140,577, dated July 8, 1873; application filed August 28, 1872.

*To all whom it may concern:*

Be it known that I, LEVI R. COMSTOCK, of Philadelphia, in the county of Philadelphia and State of Pennsylvania, have invented a new and valuable Improvement in Means for Draining Basins; and I do hereby declare that the following is a full, clear, and exact description of the construction and operation of the same, reference being had to the annexed drawings making a part of this specification, and to the letters and figures of reference marked thereon.

Figure 1 of the drawings is a representation of a partial sectional view of my invention.

This invention has relation to means for purifying or cleaning basins or low places in harbors, rivers, and other places of like character; and it consists in the construction and novel arrangement of the pump and drain-pipes, whereby the foul water and slime may be raised from the basin bottom, discharged into the conducting-pipe above the water-surface, and conveyed off below the water-line by atmospheric pressure, all as hereinafter described.

In the accompanying drawings, the letter A designates the line of the river bottom, in which there may be a low place or basin, B, receiving and retaining foul water, slime, and other miasmatic matter. If this basin exists near a city or habitation it will create sickness unless its stagnant contents be removed, and it is the object of this invention to perform this office in an economical and efficient manner. The letter C designates a pipe of large diameter, extending from above the surface of the water down to the river bottom, where it makes a bend and is continued down stream as far as may be desirable, or until a portion of the river bottom is reached over which the running water has free play. That portion of the pipe above the surface of the water is provided with a funnel or reservoir, D, which should be at some distance above the water-line. E represents a pump or other elevator reaching to the bottom of the basin, and serving to raise the slime and foul water therefrom, discharging the same constantly into the conducting-pipe C.

It is apparent that as that portion of the pipe C above the water-line is filled, the atmospheric pressure will carry its contents down, forcing whatever may be in the pipe out at its discharging-end, which lies under the water, and upon a part of the river bottom over which the water has free play. Thus the foul matters may be easily removed from the basin and conveyed where they will be dissipated by the natural action of the water.

What I claim as my invention, and desire to secure by Letters Patent, is—

For draining basins, the combination, with the elevator E, of the bent conducting-pipe C having its discharging end below the water and level with the river bottom, and its receiving end extended some distance above the water-surface, substantially as specified.

In testimony that I claim the above I have hereunto subscribed my name in the presence of two witnesses.

LEVI R. COMSTOCK.

Witnesses:
   D. D. KANE,
   PHIL. C. MASI.